United States Patent [19]
Lee

[11] Patent Number: 5,876,120
[45] Date of Patent: Mar. 2, 1999

[54] APPARATUS AND METHOD FOR MEASURING FOOD TEMPERATURE IN MICROWAVE OVEN

[75] Inventor: Koon-Seok Lee, Kyungsangnam-Do, Rep. of Korea

[73] Assignee: LG Electronics, Inc., Seoul, Rep. of Korea

[21] Appl. No.: 873,177

[22] Filed: Jun. 11, 1997

[51] Int. Cl.$^6$ ..................................................... G01J 5/14
[52] U.S. Cl. ........................................... 374/149; 374/133
[58] Field of Search .................................... 374/120, 121, 374/122, 126, 128, 133, 149

[56] References Cited

U.S. PATENT DOCUMENTS

| | | | |
|---|---|---|---|
| 4,191,876 | 3/1980 | Ohkubo et al. | 374/149 |
| 5,045,658 | 9/1991 | Smith | 374/149 |
| 5,150,969 | 9/1992 | Goldberg et al. | 374/128 |
| 5,436,443 | 7/1995 | Abtahi | 374/126 |
| 5,589,094 | 12/1996 | Bu | 374/149 |
| 5,693,247 | 12/1997 | Bu et al. | 374/149 |
| 5,696,703 | 12/1997 | Barber | 374/126 |
| 5,702,626 | 12/1997 | Kim | 374/149 |

FOREIGN PATENT DOCUMENTS

| | | | |
|---|---|---|---|
| 58-216920 | 12/1983 | Japan | 374/149 |

*Primary Examiner*—G. Bradley Bennett

[57] ABSTRACT

An apparatus and method for measuring a food temperature in a microwave oven makes it possible to precisely measure a temperature of food placed in a microwave oven by providing thereto a simple circuit composition in order to carry out the measurement without regard to kinds of food, cooking, heating device or temperature variation therearound. The apparatus and method realizes a simplified temperature measuring apparatus, thereby facilitating miniaturization thereof and reinforcing price competitiveness, wherein the compensation voltage variation with regard to an ambient temperature variation is adjusted to disclose a linear characteristic, and a new output voltage is generated using a final output voltage and a compensation voltage in a temperature range in which the compensation voltage is non-linearly disclosed in accordance with the variation of the ambient temperature, thereby precisely compensating the ambient temperature which is variable in a wide range thereof.

14 Claims, 7 Drawing Sheets

APPARATUS AND METHOD FOR MEASURING FOOD TEMPERATURE IN MICROWAVE OVEN

BACKGROUND OF THE INVENTION

1. Field of the Invention

The present invention relates to a microwave oven, and more particularly to an improved apparatus and method for measuring a food temperature in a microwave oven, which makes it possible to precisely measure a temperature of the food placed in a microwave oven by providing thereto a simple circuit composition in order to carry out the measurement without regard to kinds of food, cooking, heating device or temperature variation therearound.

2. Description of the Prior Art

As shown in FIG. 1, a general microwave oven includes: a turntable 30 for receiving food 20 thereon in a heating chamber 10; a driving motor 40 for rotating the turntable 30; a magnetron 50 and a heater 60 for respectively serving to heat the food 20 in the form of microwave energy or heat; a temperature detecting circuit 70 for detecting infrared rays being emitted from the food 20 and measuring a temperature of the food 20; and a microcomputer 80 for controlling the operation of the magnetron 50 and the heater 60 in accordance with the temperature measured in the temperature detecting circuit 70.

As further shown in FIG. 2, the temperature detecting circuit 70 includes: a thermopile sensor 11 outputting a voltage Va corresponding to the infrared rays emitted from the food 20 and a voltage Vb corresponding to an ambient temperature; and a temperature amplifier 12 for compensating for a voltage Vd decreased or increased in conjunction with the ambient temperature under the output voltage Va of the thermopile sensor 11.

The temperature amplifier 12 includes: an amplifier 12a for amplifying the output voltage Va of the thermopile sensor 11; a temperature compensator 12b for amplifying the output voltage Vb of the thermopile sensor 11 and outputting the compensated voltage Vd, an adder 12c for adding an output voltage Vc of the amplifier 12a and the compensating voltage Vd of the temperature compensator 13; and an amplifier 12d for amplifying an output valve of the adder 12c and outputting a temperature detecting voltage V0. Here, Vc denotes a ground voltage in common.

The operation of the thusly constituted conventional microwave oven and the temperature measuring circuit 70 will now be described with reference to FIGS. 1 and 2.

First, the food 20 for being cooked is placed on the turntable 30 by a user, and a cooking type is keyed in by using a menu setting board, so that the microcomputer 80 recognizes the input menu and accordingly serves to drive the turntable driving motor 40, and the magnetron 50 or the heater 60.

The food 20 placed on the turntable 30 is rotated in conformation with the driving of the turntable driving motor 40, and the rotating food 20 starts heated by microwave energy or heat in accordance with the driving of the magnetron 50 or the heater 60.

At this time, the thermopile sensor 11 in the temperature measuring circuit 70 outputs the voltage Va corresponding to the infrared rays reflected from the food 20 and received through an incidence window A.

Here, the output voltage Va in the thermopile sensor 11 becomes variable depending upon the ambient temperature, so that the effect resulting from the ambient temperature should be compensated for by using a temperature compensating device which may be a thermistor or a diode disposed inside or around the thermopile sensor 11. When the temperature compensating device serves as a thermistor, the output valve of the temperature compensating device becomes a resistance value, and when the temperature compensating device serves as a diode, the output valve of the temperature compensating device becomes a voltage value.

With reference to FIG. 2, a diode is employed as a temperature compensating device and disposed inside the thermopile sensor 11.

The thermopile sensor 11 outputs the voltage Va generated due to the infrared rays emitted from the food 20, and the voltage Vb measured in an internal temperature compensating device (not shown).

The amplifier 12a of the temperature amplifier 12 amplifies the output voltage Va of the thermopile sensor 11. The temperature compensator 12b amplifies the output voltage Vb of the temperature compensating device (not shown). The adder 14 adds the output voltage Vc of the amplifier 12a and the output voltage Vb of the temperature compensator 12b.

At this time, the output of the adder 12c becomes a voltage in accordance with the surface temperature of the food 20 which is obtained by removing the effect of the ambient temperature of the thermopile sensor 11 from the output voltage Va of the thermopile sensor 11. The amplifier 12d amplifies the output of the adder 12c and outputs the amplified resultant valve to the microcomputer 80 which detects the temperature of the food 20 in accordance with the output voltage V0 of the temperature amplifier 12, and in accordance with the detected temperature, the time required for thawing or cooking the food 20 is calculated, during which time the magnetron 50 or the heater 60 is driven to thereby carry out a thawing or cooking function.

Referring to FIG. 3 illustrating another example of the temperature amplifier 12, the thermistor 14 serving as the temperature compensating device is disposed adjacent to the thermopile sensor 11.

The temperature amplifier 13 includes: an amplifier 13a a non-inverting terminal of which is connected to the output voltage Va of the thermopile sensor 11, and an inverting terminal of which is connected through a resistance R1 to a reference voltage Vref and through a resistance R2 to an output terminal thereof; an amplifier 13b a non-inverting terminal of which is connected to the reference voltage Vref, and an inverting terminal of which is connected through a resistance R3 and the resistance Rth of the thermistor 14 to a ground voltage and at the same time through the resistance R4 to an output terminal thereof; an adder 13c for adding the respective voltage values outputted from the amplifiers 13a, 13b; and an amplifier 13d a non-inverting terminal of which is connected to the output terminal of the adder 13c, and an inverting terminal of which is connected through a resistance R7 to the reference voltage Vref and through a resistance R8 to an output terminal thereof.

The operation of the thusly constituted temperature measuring circuit 70 will now be described with reference to FIG. 3.

The thermopile sensor 11 receives the infrared rays emitted from the food surface via the incidence window A, and outputs voltage Va corresponding to the received infrared rays. The amplifier 13a compares the output voltage Va of the thermopile sensor 11 with the reference voltage Vref, amplifies and outputs to the adder 13c the resultant value, in accordance with Equation 1.

$$Vc = \frac{(R1+R2)}{R1} Va + Vref \quad (1)$$

The amplifier 13b of the temperature compensator 12b compares the voltage measured adjacent to the thermopile sensor 11 with the reference voltage Vref, amplifies the compared value and outputs the compensating voltage Vd to the adder 13c, according to Equation 2.

$$Vd = Vref + \frac{R4}{Rth+R3} Vref = Vref + \angle Vd \quad (2)$$

Here, when the respective values of the resistance R5 and the resistance R6 are set identically to each other, the output value of the adder 12c becomes (Vc+Vd)/2, and the amplifier 13d compares the output valve of the adder 12c with the reference voltage Vref and amplifies and outputs to the microcomputer 80 the compared value, in accordance with Equation 3.

$$V0 = \frac{R7+R8}{R7} \frac{Vc+Vd}{2} \frac{R7}{R8} Vref = \quad (3)$$

$$\frac{R7+R8}{R7}\left[\frac{R1+R2}{R1} Va + \angle Vd\right] + Vref$$

That is, referring to Equation 3, when the ambient temperature of the thermopile sensor 11 is raised by 1C°, the output voltage Vc of the amplifier 13a is decreased by 10 mV, and when the resistance pair R3, R4 are set in order for voltage Vd to become increased by 10 mV, the effect by the ambient temperature of the thermopile sensor 11 can be excluded.

Therefore, the microcomputer 80 detects the temperature of the food 20 in accordance with the output voltage V0 of the temperature amplifier 12, and in accordance with the detected temperature, the time for thawing or cooking the food 20 is obtained, during which time the magnetron 50 or the heater 60 is driven for thereby carrying out the thawing or cooking operation.

In general, in the case in which a magnetron is employed as a heating member, the respective temperatures of the food 20 and the heating chamber 10 do not generally exceed 120° C., and when no food is placed on the turntable 30, the temperature of the turntable 30 exceeds 150° C.

When the heater 60 is employed to heat the food 20, the temperature of the heating chamber 10 comes to exceed 200° C., and the temperature variation for thawing or cooking the food 20 ranges from −10° C. to 200° C.

Here, in case of thawing the food 20, the microcomputer 80 is required to measure the food temperature by 1° C. unit.

At this time, although cost-effective types are applied to the amplifiers 13a, 13b, 13d in consideration of their prices, the output voltage of the amplifiers do not exceed 3.3 V at the worst, and it is difficult to lower the minimal voltage than 0.5 V due to a technical limit in design.

The microcomputer 80 is operated under 5 V to thereby process an 8-bit data set, the voltage disassembling capacity is referred to as 5 V/(2)²=5/256=0.0195 V.

As a result, the output voltage of the amplifier 12d becomes 2.8 V, and when the microcomputer 80 measures the temperature by 1° C. unit, the temperature measurement is confined to a scope ranging from −10° C. to 134° C. (2.8 V/0.0195 V=144) instead of from −10° C. to 200° C.

Also, the temperature measurement of the microcomputer 80 is confined to a scope ranging from −10° C. to 134° C., so that when the magnetron is selected as a heating member, there is a possibility in which an over heating or fire may occur. Further, when employing the heater, the temperature variation of the food ranges from −10° C. to 200° C., for thereby disabling temperature measurement of the food.

Conclusively, in the conventional microwave oven, the temperature measurement range of food is confined by the limited measurement scope of the microcomputer 80, and therefore the conventional microwave oven does not appropriately respond to the temperature measurement range which is variable depending upon whether the food is placed on the turntable, and upon the kinds of cooking and heating member.

Further, the conventional microwave oven separately provides the temperature compensator 12b and the fourth amplifier for excluding influence resulting from the ambient temperature, and the temperature measurement circuit 70 is formed of a plurality of parts, for thereby deteriorating price competitiveness.

SUMMARY OF THE INVENTION

Therefore, it is an object of the present invention to provide an apparatus and method for measuring a food temperature in a microwave oven which makes it possible to precisely measure a temperature of food placed in a microwave oven by providing thereto a simple circuit composition in order to carry out the measurement without regard to kinds of food, cooking, heating device or temperature variation therearound.

To achieve the above-described object, there is provided an apparatus for measuring a food temperature in a microwave oven according to the present invention which includes: a first amplifier for receiving from a thermopile sensor a voltage Va corresponding to infrared rays emitted from food placed in the microwave oven, a second amplifier for receiving from a temperature compensating device stored in the thermopile sensor a voltage Vb corresponding to an ambient temperature and amplifying the received value, an adder for adding respective output voltage values of the first and second amplifiers, an amplifier unit composed of a plurality of amplifiers and sequentially amplifying an output voltage of the adder, and a microcomputer for measuring, when a magnetron is employed for the food, a temperature of the food in accordance with an output value of a final amplifier in the amplifier unit, and measuring, when a heater is employed for the food, a temperature of the food in accordance with output values other than that of the final amplifier in the amplifier unit.

Further, to achieve the above-described object, there is provided an apparatus for measuring a food temperature in a microwave oven according to the present invention which includes a first amplifier for receiving from a thermopile sensor a voltage Va corresponding to infrared rays emitted from food placed in the microwave oven, a second amplifier for receiving from a temperature compensating device stored in the thermopile sensor a voltage Vb corresponding to an ambient temperature and amplifying the received value, an adder for adding respective output voltage values of the first and second amplifiers, a third amplifier for amplifying to a predetermined level an output voltage of the adder, a microcomputer for measuring a temperature of the food in accordance with an output value of the third amplifier when a magnetron is employed for the food, and with a voltage inputted to the third amplifier when a heater is employed for the food, respectively.

Still further, to achieve the above-described object, a food temperature measuring apparatus for a microwave oven according to the present invention which includes a thermopile sensor for detecting infrared rays emitted from food placed in the microwave oven and outputting a voltage Va corresponding thereto, a compensation voltage generator for generating a compensation voltage Vb having a linear characteristic with regard to an ambient temperature, an amplifying unit for comparing the compensation voltage Vb outputted from the compensation voltage generator and the voltage Va outputted from the thermopile sensor and amplifying the compared value, and a microcomputer for measuring a temperature of the food in accordance with an output voltage of the amplifier.

Also, to achieve the above-described object of the present invention, a food temperature measuring method for a microwave oven provided with a first and second amplifiers for respectively amplifying voltage values each corresponding to infrared rays emitted from food in the microwave oven and to an ambient temperature, a third amplifier for adding the first and second amplifiers thereto and amplifying the added value, and a microcomputer for detecting a temperature of the food in accordance with an output value of the third amplifier, includes a first step for determining, when a cooking selection key is inputted by a user, whether the selected cooking is to employ a magnetron or a heater, a second step for, when the magnetron is selected in the first step, receiving an output voltage of the third amplifier, measuring the food temperature by 1° C., and checking whether the measured temperature is reached to a maximum value in a food temperature measuring range, a third step for, when the heater is selected in the first step or the measured temperature is reached to the maximum value in a food temperature measuring range, receiving an input voltage of the third amplifier and measuring the food temperature by 2° C. unit, and a fourth step for controlling a heating means and carrying out a desired cooking, in a case in which the measured temperature is not reached to a maximum value in the food temperature measuring range in the second step and a temperature measurement is completed in the third step.

To further achieve the above-described object of the present invention, a food temperature measuring method for a microwave oven provided with a compensation voltage generator for generating a compensation voltage Vb having a linear characteristic with regard to an ambient temperature, an amplifying unit for comparing the compensation voltage Vb outputted from the compensation voltage generator and the voltage Va outputted from the thermopile sensor and amplifying the compared value, and a microcomputer for measuring a temperature of the food in accordance with an output voltage of the amplifier, includes the steps of measuring a temperature of the food in accordance with an output value of the amplifier in a temperature range in which a compensation voltage is linearly varied, and an output voltage and a compensation voltage of the amplifying unit in a temperature range in which a compensation voltage is non-linearly varied, calculating an ambient temperature corresponding to the measured compensation voltage and an ideal compensation voltage at the calculated ambient temperature, computing a difference value between the calculated ideal compensation voltage and the measured compensation voltage, and adding the difference to the output voltage of the amplifying unit, for thereby generating a new voltage, and measuring a temperature of the food in accordance with the generated voltage and carrying out a cooking function in accordance therewith.

DETAILED DESCRIPTION OF THE PRESENT INVENTION

Figure 1:
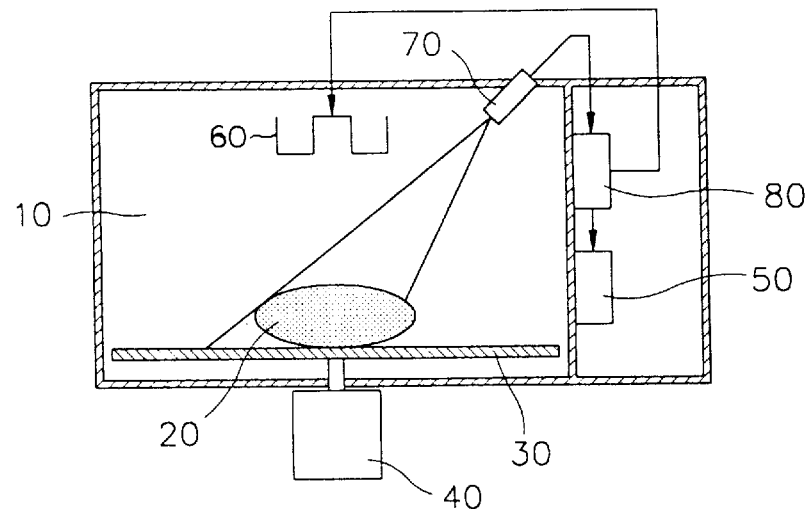
FIG. 1 is a structural view of a general microwave oven.
Figure 2:
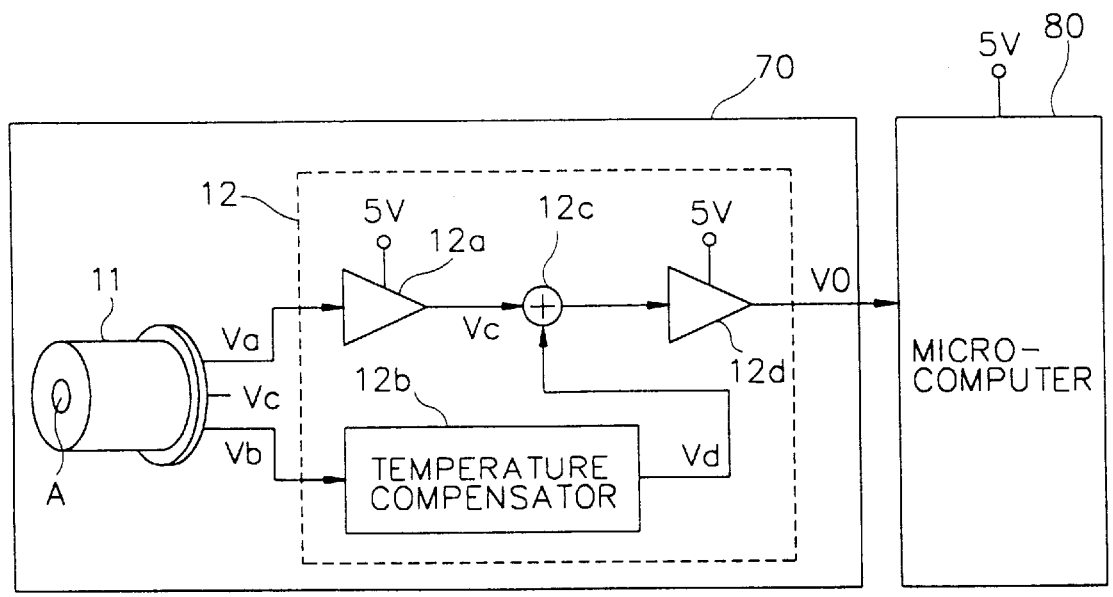
FIG. 2 is a block diagram of a food temperature measuring apparatus in FIG. 1 according to a first example of the conventional art.
Figure 3:
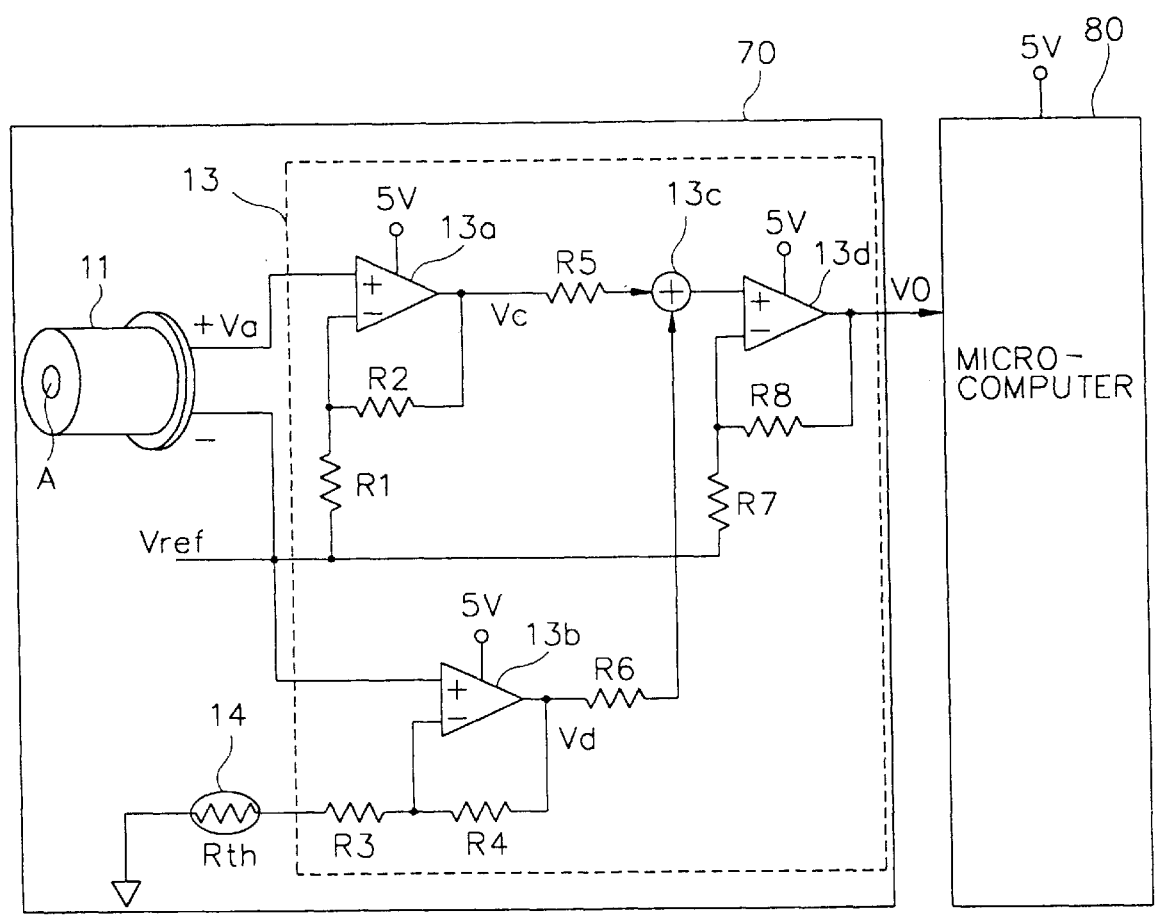
FIG. 3 is a block diagram of a food temperature measuring apparatus in FIG. 1 according to a second example of the conventional art.

The composition of a microwave oven applicable to the present invention generally follows that of the microwave oven illustrated in FIG. 1.

Figure 4:
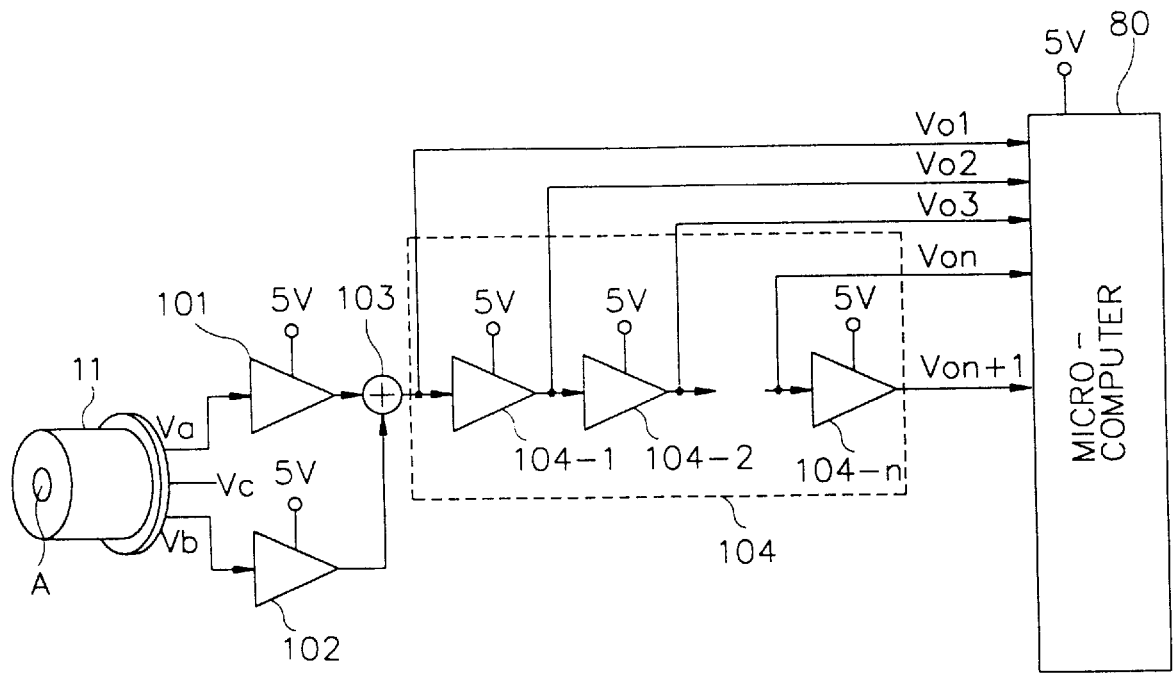
FIG. 4 is a block diagram of a food temperature measuring apparatus according to a first embodiment of the present invention.

With reference to FIG. 4, the food temperature measuring apparatus according to the present invention includes: a first amplifier 101 for receiving from a thermopile sensor 11 a voltage Va corresponding to a difference between the temperature of infrared rays emitted from food 20 and an ambient temperature, and amplifying the received valve; a second amplifier 102 for receiving from a temperature compensating device stored in the thermopile sensor 11 a voltage Vb corresponding to an ambient temperature and amplifying the received value; an adder 103 for adding respective output voltage values of the first and second amplifiers 101, 102; an amplifier unit 104 composed of a plurality of amplifiers and sequentially amplifying an output voltage of the adder 103; and a microcomputer 80 for receiving respective output values of the adder 103 and the amplifier unit 104 and controlling a food temperature measuring operation and a thawing/cooking operation.

The operation of the thusly constituted food temperature measuring apparatus according to the present invention will now be described with reference to the accompanying drawings.

First, the food 20 for being cooked is placed on the turntable 30 by a user, and a cooking type is inputted using a menu setting board, so that the microcomputer 80 recognizes the input menu and accordingly serves to drive the turntable driving motor 40, and the magnetron 50 or the heater 60.

The food 20 placed on the turntable 30 is rotated in accordance with the driving of the turntable driving motor 40, and the rotating food 20 starts heated by microwave energy or heat in accordance with the driving of the magnetron 50 or the heater 60.

At this time, the thermopile sensor 11 in the temperature measuring circuit 70 outputs the voltage Va corresponding to the infrared rays emitted from the food 20 and received through an incidence window A, and an ambient temperature of the thermopile sensor 11 is measured through a food temperature compensating device (not shown) to thereby output the voltage Vb which corresponds to the measured temperature.

The first amplifier 101 amplifies the output voltage Va of the thermopile sensor 11. The second amplifier 102 amplifies the output voltage Vb of the thermopile sensor 11. The output values of the first and second amplifiers 101, 102 are added up in the adder 103 and then sequentially amplified passing through the plurality of amplifiers in the amplifier unit 104.

The microcomputer 80 receives an output signal V01 of the adder 103 and a plurality of output signals V02, . . . , V0n+1 of the amplifier unit 104, detects the food temperature, calculates time required for thawing or cooking the food 20 in accordance with the detected temperature, and serves to carry out the food thawing or cooking by driving the magnetron 50 or the heater 60 during the calculating time.

At this time, a potential of 5 V is applied to the first, and second amplifiers 101, 102, and the plurality of amplifiers in the amplifier unit 104, respectively. The microcomputer 80 adopts an 8-bit data processing under a source voltage of 5 V in consideration of its price, and the voltage disassembling capacity thereof is reached up to 0.0195 V.

In order to measure a temperature of the food 20 by a unit of 1° C., each time when the food temperature is varied by 1° C., the output voltage of the amplifiers should be varied at least by 0.0195 V.

When the amplifiers remain ideal, the food temperature measurement scope of the microcomputer 80 in a case in which the measurement is carried out by 1° C. unit, is incorporated in 5 V/(0.0195 V/1° C.)=256° C.

The output voltages Va, Vb of the thermopile sensor 11 is so minute that the amplifiers respectively are an OP amplifier, and the highest output voltage of an economical OP amplifier becomes 3.5 V.

Also, because the adder 103 adds up the first and second amplifier 101, 102, it is extremely difficult to lower below 0.5 V the output voltage Von+1 of the amplifier 104.

The variation width of the output voltage V0n+1 of the amplifier unit 104 ranges from 3.5 V to 0.5 V, and the microcomputer 80 measures a temperature up to (3.5 V–5 V)/(0.0195 V/1° C.)=154° C.

In general, when food is cooked in a microwave oven, a temperature variation width ranges from –10° C. to 200° C.

That is to say, a temperature for thawing frozen food ranges from –10° C. to 200° C., a temperature for generally warming food ranges from 0° C. to 100° C., a temperature for boiling food is set around 100° C., and a temperature for frying food is around 120° C.

A cooking for being done by a heater in a microwave oven can be varied to a fish broiling, a chicken roasting and the like, wherein a temperature in the heating chamber 10 exceeds 200° C., and because a maximum temperature should surpass 200° C. in case of a microwave oven which adopts a heater cooking, the thusly measured food temperature exceeds 210° C.

Here, the output variation width of the amplifiers ranges from 0.5 V to 3.5 V, so that when a temperature of the food 20 is measured by 1° C. unit, the food temperature measurement of the microcomputer 80 ranges from –10°C. to 144° C., thereby disabling the temperature measurement during cooking by the heater.

The present invention, as shown in FIG. 4, enables the food temperature measurement range to be variable by measuring the respective output signals V01~V0n+1 of the amplifier unit 104.

That is, when a precise temperature measurement by 1° C. unit is required, the microcomputer 80 measures the food temperature in accordance with an output voltage V0n+1 of the last amplifier 104-n in the amplifier unit 104, and when the food in the heating chamber does not require a precise temperature measurement, although the food requires a temperature as high as in a heater cooking, the food temperature is measured in accordance with the output voltages V01–V0n outputted from the amplifiers 104-1–10-n-1 other than the last amplifier 104-n.

Figure 5:
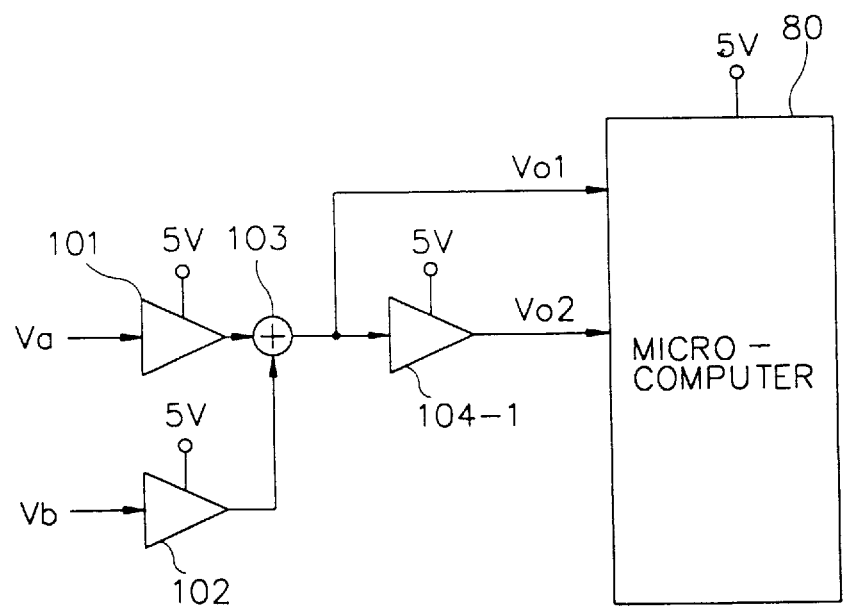
FIG. 5 is a block diagram of one amplifier selected from unit amplifiers in the food temperature measuring apparatus in FIG. 4.
Figure 6:
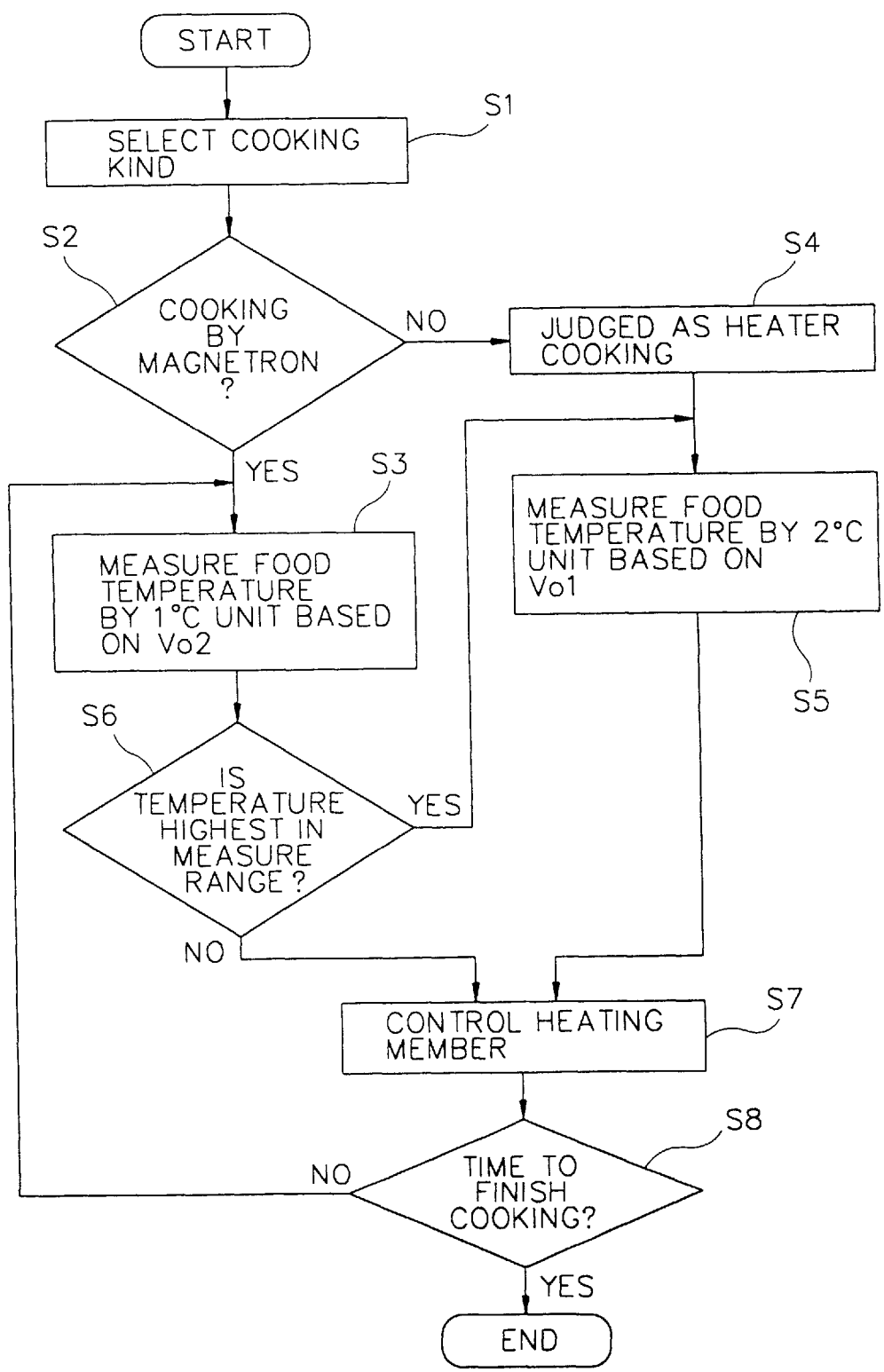
FIG. 6 is a flow chart illustrating food temperature measurement steps in FIG. 3.

An example, a three-amplifier set 101, 102, 104-1 as shown in FIG. 5 will now be described with further reference to FIG. 6.

The amplifying rate of the amplifier 104-1 is fixed twice that of an OP amplifier, and the amplifying rates of the amplifiers 101, 102 are respectively adjusted for the output voltage V02 of the amplifier 104-1 to vary by 0.0195 V each time when the food temperature changes by 1° C., so that the output voltage values of the amplifiers 101, 102 vary by more than 0.039 V each time when the food temperature changes by 2° C.

First, when a cooking selection key is pushed (Step S1) by a user, the microcomputer 80 determines (Step S2) whether the selected cooking is to employ the magnetron 50.

At this time, the cooking for using the magnetron 50 varies to thawing, warming, and boiling, and the food temperature measuring scope is confined within 120° C.

With the determination result, when the cooking is judged to employ the magnetron 50, the microcomputer 80 controls the magnetron 50 to heat the food 20, and receives the output voltage V02 of the amplifier 104-1 which changes by 0.0195 so as to measure (Step S3) the food temperature by 1° C. unit.

Because the output voltage values of the amplifiers 101, 102, 104-1 may be less than 3.5 V due to a single error thereof (about 3.3 V), the highest temperature that can be measured by the microcomputer 80 is set at 134° C. when only the magnetron 80 is employed.

Meanwhile, when the selected cooking is judged to employ the heater 60, the microcomputer 80 receives an output voltage V01 of the amplifier 104-1 and measures the food temperature in 2° C. unit. (Steps S4, S5)

At this time, the cooking for using the heater 60 varies to a fish boiling, a chicken roasting and the like, wherein the food temperature measurement is required up to 200° C.

When the cooking is carried out by using the magnetron 50, the microcomputer 80 serves to check whether the measured temperature allowed is reached up to the highest temperature (134° C.), and when the measured temperature is reached to the highest temperature 134° C., the temperature is measured by 2° C. unit in accordance with the output voltage V01 of the amplifier 104-1. (Steps S6, S5)

Here, when the cooking is carried out by using only the magnetron 50 and when the measurement temperature does not exceed the highest temperature 134° C., it is the case in which there is not any food in the heating chamber or there occurs a fire in the heating chamber 10 or a dried fish such as squid is roasted therein, and at this time the temperature is measured by 2° C. unit by using the input voltage V01 of the amplifier 104-1.

To the contrary, in the case in which the cooking is carried out by the magnetron 50, when the measured temperature is not reached up to the highest allowable temperature (134° C.), or when the cooking is carried out by the heater 60, the cooking operation is carried out (Step 7) by controlling an additional heating device which can be the magnetron or heater.

Thereafter, when a cooking terminal point is reached, the cooking is terminated, and when the cooking terminal point is not reached, the food temperature is continuously measured using the output voltage V01 or the output voltage V02, for thereby controlling (Step S8) the heating device.

That is, the present invention divides the amplifier into multiple steps with regard to its operation in the food temperature measuring circuit, and an output voltage of each of the steps is measured, thereby making variable the food temperature measurement range, irrespective of food existence in the heating chamber, kinds of cooking and employed heating device.

Figure 7:
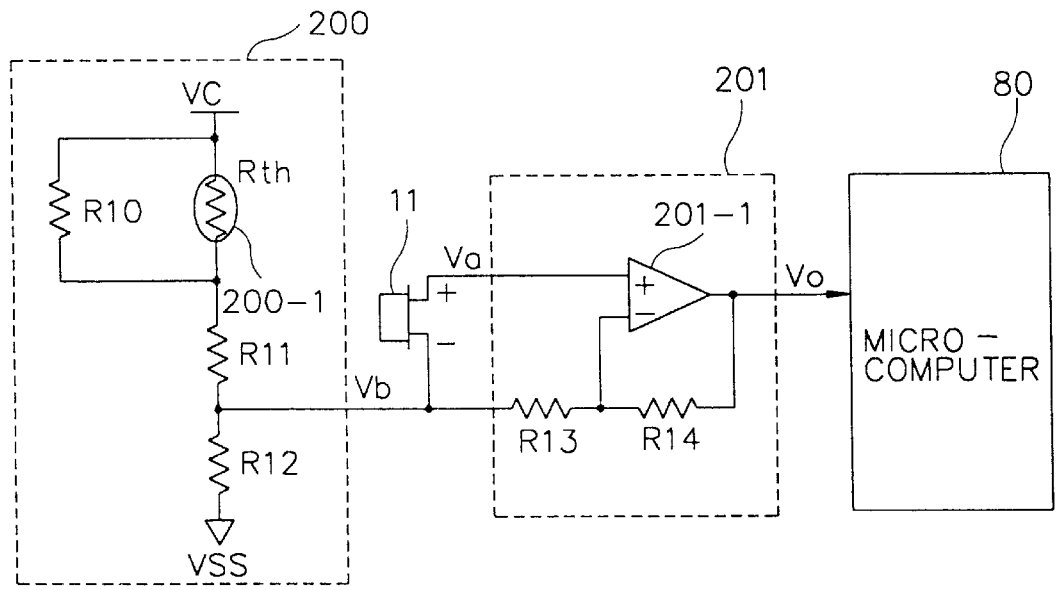
FIG. 7 is a block diagram of a food temperature measuring apparatus according to a second embodiment of the present invention.

With reference to FIG. 7 illustrating a food temperature measuring apparatus according to the second embodiment of the present invention, the apparatus includes: a compensation voltage generator 200 for generating a compensation voltage Vb having a linear characteristic with regard to an ambient temperature; and an amplifying unit 201 for comparing the compensation voltage Vb of the compensation voltage generator 200 and the voltage Va outputted from the thermopile sensor 11, amplifying the compared value, and outputting the amplified value to the microcomputer 80.

The compensation voltage generator 200 includes: a thermistor 200-1, a resistance R11, and a resistance R12 which are serially connected to each other between a source voltage Vc and a ground voltage; and a resistance R10 connected in parallel with the thermistor 200-1.

The amplifying unit 201 is provided with an amplifier 201-1 a non-inverting terminal of which is connected to an output voltage Va terminal of the thermopile sensor 11, and an inverting terminal of which is connected through a resistance R13, an output terminal of the compensation voltage generator 200, and a resistance R14 to an output terminal thereof.

The operation of the thusly constituted second embodiment of the present invention will now be described.

The thermopile sensor 11 receives ultraviolet energy reflected from food surface and outputs voltage Va corresponding to the received ultraviolet energy. The compensation voltage generator 200 measures an ambient temperature of the thermopile sensor 11 in accordance with the thermistor 200-1, and outputs compensation voltage Vb having a linear characteristic with regard to a temperature variation, according to Equation 4.

$$Vd = \frac{R10 * R12 * Rth}{R10 * Rth + (Rth + R10) * (R11 + R12)} Vc \quad (4)$$

Figure 10:
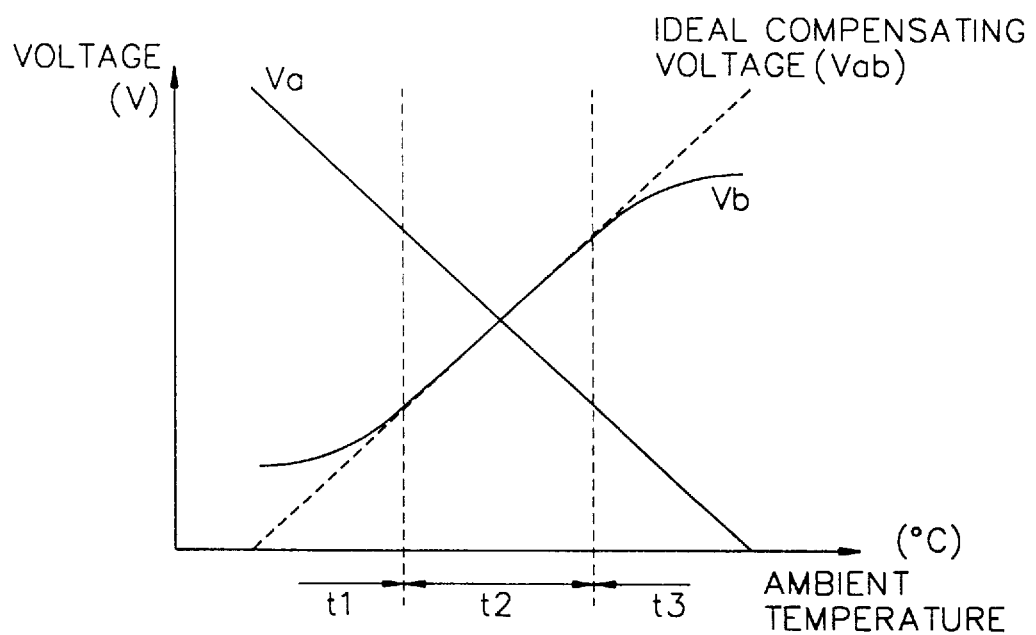
FIG. 10 is a graph illustrating an output characteristic and a compensation voltage characteristic of a thermopile sensor with regard to an ambient temperature.
Figure 11:
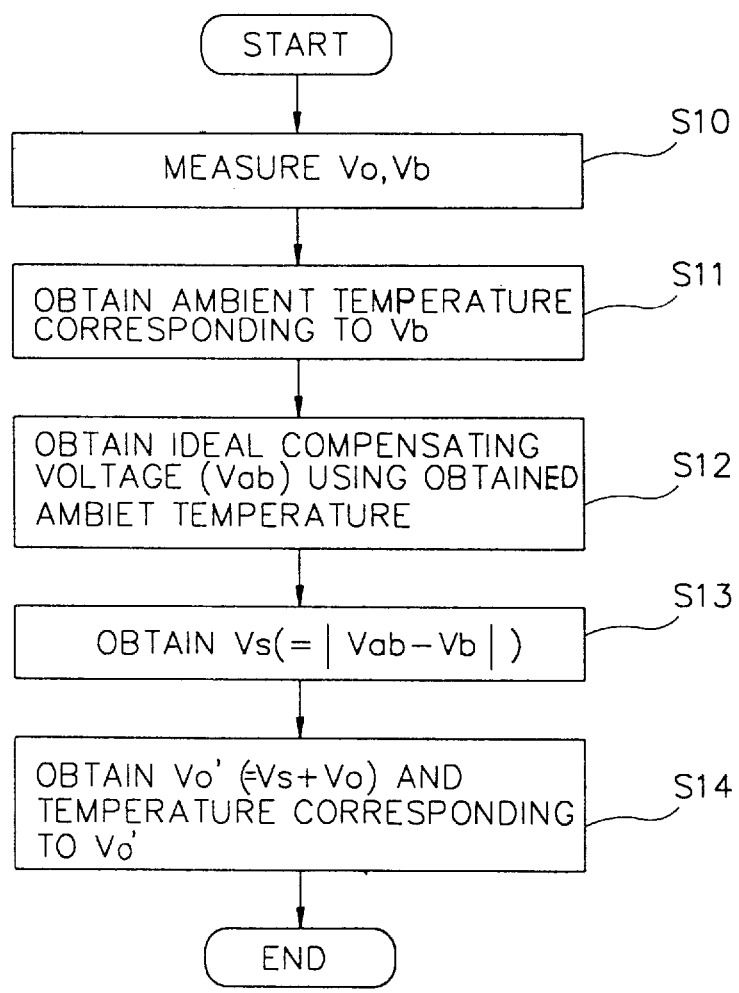
FIG. 11 is a flow chart illustrating food temperature measurement in FIG. 7.

With reference to FIG. 10 illustrating a relation between compensation voltage Vb and an ambient temperature, the respective values of the resistances R10, R11, R12 are selected so as to produce a linear slant of the compensation voltage versus the ambient temperature, and the resistance R10 serves to make less sensitive the compensation voltage variation which is determined in accordance with a resistance value of the thermistor 200-1.

Also, when the ambient temperature of the thermopile sensor 11 is varied, the resistance pair R11, R12 serve to determine the respective ranges of the temperature and the voltage, wherein the compensation voltage Vb is linearly varied.

The amplifier 201-1 of the amplifying unit 201 which are linearly variable compares the compensation voltage Vb outputted from the compensation voltage generator 200 and the output voltage Va of the thermopile sensor 11, amplifies the compared value, and outputs the final output value V0 to the microcomputer 80, wherein the output voltage V0 is incorporated in Equation 5 in the following.

$$V0 = \frac{R13 + R14}{R13} Va + Vb \quad (5)$$

With regard to a principle for compensating an ambient temperature according to Equation 5, when the ambient temperature is higher or lower than 25° C. in consideration of a reference ambient temperature of 25°C., Equation 5 is converted into Equation 6 in accordance with variation of the ambient temperature, as follows.

$$V0 = \frac{(R13 + R14)}{R13} (Va(25) + \angle Va) + Vb(25) + \angle Vb \quad (6)$$

Here, Va(25) and Vb(25) respectively denote an output voltage Va and a compensation voltage Vb of the thermopile sensor 11 under an ambient temperature of 25° C.

That is, the output voltage Va of the thermopile sensor 11 is varied as much as , and the compensation voltage Vb is varied as much as ∠Vb.

Therefore, considering the characteristics of the output variation and thermistor according to the ambient temperature variation of the thermopile sensor 11, the values of the resistances R10, R11, R12, R13, R14 are set so as to satisfy a relation of within a desired temperature range.

Figure 8:
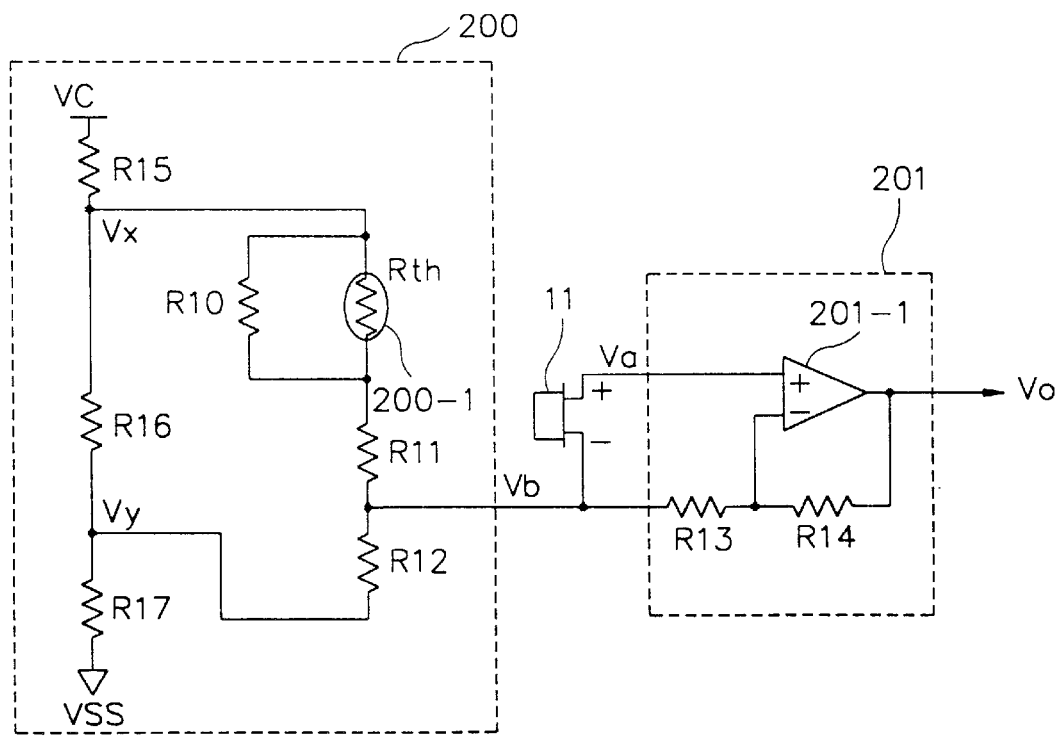
FIG. 8 is a block diagram of a food temperature measuring apparatus according to a second embodiment of the present invention.

FIG. 8 illustrates a food temperature measuring apparatus according to the third embodiment of the present invention, wherein the compensation voltage generator 200 disclosed in FIG. 7 according to the second embodiment of the present invention is replaced by a compensation voltage generator 200'.

The compensation voltage generator 200 includes: resistances R15, R16, R17 serially connected between a supply voltage Vc and a ground voltage; a thermistor 201, resistances R11, R12 connected in parallel to each end of the resistance R16; and a resistance R10 connected in parallel to the thermistor 200-1.

That is, the third embodiment of the present invention as shown in FIG. 8 is employed when it is required to entirely raise voltage to a certain level with regard to the compensation voltage Vb outputted from the compensation voltage generator 200.

As an example, when the voltage for operating the amplifier 201-1 ranges from 0.5 V to 3.5 V, the compensation voltage Vb should be raised to a level offset voltage so that the output voltage V0 of the amplifier 201-1 becomes more than 0.5 V even at the worst case thereof.

The voltage Vy determines magnitude of the offset component of the compensation voltage Vb, so that when the value of the resistance R17 is adjusted so as for the voltage Vy to become iV, the minimal voltage of the compensation voltage Vb becomes iV, and the magnitude of Vx−Vy determines the magnitude (∠Vb/°C.) of the compensation voltage increment which is variable according to a unit temperature increase.

At this time, Equation 4 incorporating the compensation voltage Vb is modified into Equation 7 as follows.

$$Vb = \frac{R10 * R12 * Rth}{R1 * Rth + (Rth + R10) * (R11 + R12)} (x - Vy) \quad (7)$$

Here, the resistances R10, R11, R12 serve for the compensation voltage Vb to become linear with regard to an ambient temperature variation, and the resistances R10, R11, R12, R15, R16, R17 respectively have a value of zero or an infinite value in an ambient temperature interval which has a temperature characteristic of the thermistor 200-1 and a linear compensation voltage characteristic, and in those cases the corresponding resistances are removed.

Figure 9:
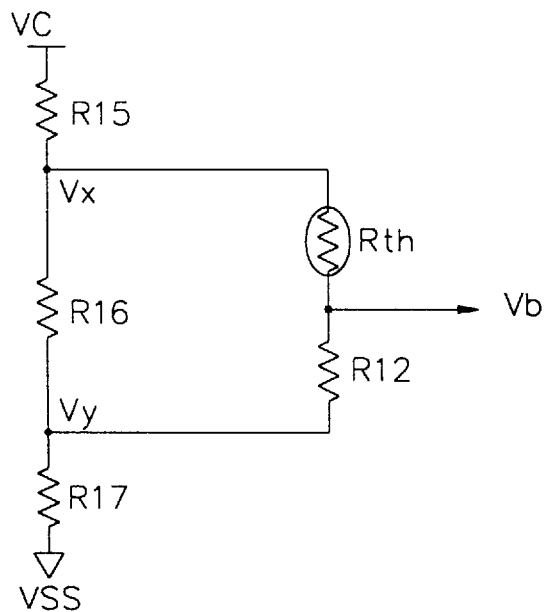
FIG. 9 is an equivalent circuit view with regard to FIG. 8, wherein resistance R10 is provided with an infinite value and resistance R11 is provided with zero.

That is, the resistance R10, R16 respectively have an infinite value, and the resistances R11, R12, R15, R17 respectively have a value of zero for thereby being removed, and at this time, when the resistance R10 has an infinite value and the resistance T11 has a value of zero, the equivalent circuit is as shown in FIG. 9.

As described above, the present invention enables the variation of the compensation voltage Vb versus the ambient temperature variation to follow a linear characteristic, for thereby compensating for the variation of the ambient temperature.

With reference to FIG. 10 illustrating a relation of an ideal compensation voltage Vab and a feasible compensation voltage Vb, the variation of the compensation voltage Vb versus the ambient temperature variation has a non-linear characteristic, so that the output voltage Va of the thermopile sensor 11 in accordance with the ambient temperature variation is generally provided with a linear characteristic.

Here, the compensation with regard to an ambient temperature influence is desirably achieved within a temperature range t2 in which the compensation voltage Vb is linearly varied, and the compensation amount in temperature ranges t1, t3 in which the compensation voltage Vb is non-linearly varied becomes excessive or lacking.

Therefore, the microcomputer 80 obtains an optimal compensation voltage from the output voltage V0 of the amplifier 201 and the compensation voltage Vb, and carries out a control operation by measuring a food temperature, so that a precise temperature compensation is achieved in the temperature ranges t1, t3 in which the compensation voltage Vb exhibits a non-linear characteristic.

That is, the microcomputer 80 measures (Step S10) the output voltage V0 of the amplifying unit 201 and the compensation voltage Vb in the temperature ranges t1, t3 in which the compensation voltage Vb non-linearly appears, and obtains (Step S11) an ambient temperature corresponding to the compensation voltage Vb measured in the graph of FIG. 10.

The ideal compensation voltage Vab is calculated from the obtained ambient temperature, and a voltage difference Vs between the obtained ideal compensation voltage Vab and the measured compensation voltage Vb is calculated (Step S12).

Therefore, the microcomputer 80 adds the voltage difference Vs to the final output voltage V0 of the amplifier 201, and generates (Step S13) a new voltage V0', so that the temperature corresponding to the generated voltage V0' is calculated, for thereby measuring (Step S14) the temperature of the food 20 in precision.

As described above, the present invention divides the amplifier operation in a temperature measurement circuit into multiple steps and then measures the output voltage of each of the steps, thereby enabling the temperature measurement range to be variable without regard to kinds of food, cooking, heating device or temperature variation therearound.

Further, the present invention realizes a simplified temperature measuring apparatus, thereby facilitating miniaturization thereof and reinforcing price competitiveness.

Still further, in the present invention, the compensation voltage variation with regard to an ambient temperature variation is adjusted to disclose a linear characteristic, and a new output voltage is generated using a final output voltage and a compensation voltage in a temperature range in which the compensation voltage is non-linearly disclosed in accordance with the variation of the ambient temperature, thereby precisely compensating the ambient temperature which is variable in a wide range thereof.

What is claimed is:

1. A food temperature measuring apparatus for a microwave oven, comprising:
   a first amplifier for receiving from a thermopile sensor a voltage Va corresponding to infrared rays emitted from food placed in the microwave oven;
   a second amplifier for receiving from a temperature compensating device stored in the thermopile sensor a voltage Vb corresponding to an ambient temperature and amplifying the received value;
   an adder for adding respective output voltage values of the first and second amplifiers;
   an amplifier unit composed of a plurality of amplifiers and sequentially amplifying an output voltage of the adder; and
   a microcomputer for measuring, when a magnetron is employed for the food, a temperature of the food in accordance with an output value of a final amplifier in the amplifier unit, and measuring, when a heater is employed for the food, a temperature of the food in accordance with output values other than that of the final amplifier in the amplifier unit.

2. A food temperature measuring apparatus for a microwave oven, comprising:
   a first amplifier for receiving from a thermopile sensor a voltage Va corresponding to infrared rays emitted from food placed in the microwave oven;
   a second amplifier for receiving from a temperature compensating device stored in the thermopile sensor a voltage Vb corresponding to an ambient temperature and amplifying the received value;
   an adder for adding respective output voltage values of the first and second amplifiers;
   a third amplifier for amplifying to a predetermined level an output voltage of the adder;
   a microcomputer for measuring a temperature of the food in accordance with an output value of the third amplifier when a magnetron is employed for the food, and with a voltage inputted to the third amplifier when a heater is employed for the food, respectively.

3. The apparatus of claim 2, wherein the third amplifier is provided with an amplifying rate twice an operational amplifier.

4. The apparatus of claim 2, wherein respective amplifying rates of the first and second amplifiers are respectively adjusted, such that each time when the food temperature changes by 1° C., an output voltage of the third amplifier is varied by more than 0.0195 V.

5. A food temperature measuring apparatus for a microwave oven, comprising:

a thermopile sensor for detecting infrared rays emitted from food placed in the microwave oven and outputting a voltage Va corresponding thereto;

a compensation voltage generator for generating a compensation voltage Vb having a linear characteristic with regard to an ambient temperature;

an amplifying unit for comparing the compensation voltage Vb outputted from the compensation voltage generator and the voltage Va outputted from the thermopile sensor and amplifying the compared value; and a microcomputer for measuring a temperature of the food in accordance with an output voltage of the amplifier.

6. The apparatus of claim 5, wherein the compensation voltage generator, comprises:

a thermistor and resistances R11, R12 serially connected between a supply voltage Vc and a ground voltage; and a resistance R10 connected in parallel with the thermistor.

7. The apparatus of claim 5, wherein the amplifying unit is provided with an amplifier a non-inverting terminal of which is connected to an output voltage Va terminal of the thermopile sensor, and an inverting terminal of which is connected to an output terminal thereof through a resistance R13, an output terminal of the compensation voltage generator, and a resistance R14.

8. The apparatus of claim 6, wherein the compensation voltage Vb outputted from the compensation voltage generator is determined in accordance with an equation of $$Vd = \frac{R10 * R12 * Rth}{R10 * Rth + (Rth + R10) * (R11 + R12)} Vc$$

9. The apparatus of claim 6, wherein respective values of the resistances R10, R11, R12 are selected so as to produce a linear variation of the compensation voltage Vb with regard to an ambient temperature variation.

10. The apparatus of claim 6, wherein the resistance R10 serves to make less sensitive the compensation voltage variation which is determined in accordance with a resistance value of the thermistor.

11. The apparatus of claim 6, wherein the resistance pair R11, R12 serve to determine an ambient temperature range and a voltage range, so that the compensation voltage Vb becomes linearly varied.

12. The apparatus of claim 5, wherein the compensation voltage generator, comprises:

resistances R15, R16, R17 serially connected between a supply voltage Vc and a ground voltage;

a thermistor and resistances R11, R12 connected in parallel with each end of the resistance R16; and a resistance R10 connected in parallel with the thermistor.

13. The apparatus of claim 12, wherein the resistances R10, R11, R12 lead the compensation voltage Vb to become linear within a desired temperature range, the resistances R10, R16 are provided with infinite values, respectively, and the resistances R11, R12, R15, R17 respectively have a value of zero, within a temperature range in which the temperature and the compensation voltage of the thermistor each have a linear characteristic.

14. The apparatus of claim 12, wherein the resistance R17 determines a magnitude of an offset component of the compensation voltage Vb.

* * * * *